Jan. 21, 1941.   A. H. KEYES   2,229,025
COLOR CHART
Filed April 29, 1939   2 Sheets-Sheet 1

Inventor.
Arthur H. Keyes
By Orwig & Hague Attys

Jan. 21, 1941.　　A. H. KEYES　　2,229,025
COLOR CHART
Filed April 29, 1939　　2 Sheets-Sheet 2

Inventor.
Arthur H. Keyes
By Orwig & Hague Attys

Patented Jan. 21, 1941

2,229,025

UNITED STATES PATENT OFFICE 2,229,025

COLOR CHART

Arthur H. Keyes, Des Moines, Iowa

Application April 29, 1939, Serial No. 270,871

1 Claim. (Cl. 88—14)

The object of my invention is to provide a color chart of simple and inexpensive construction for use in instruction of color schemes for artistic productions, decorative work, flower arrangement and the like.

More specifically, it is my object to provide a color chart of this class which may be quickly and easily adjusted by an operator to display the major varieties of color schemes, with all of the desired color combinations displayed to the eye of the operator in the desired relative positions, all color relationships shown for any one of the twelve colors, and with each color exposed to the same amount and outline and all the other colors not included in the desired color scheme fully covered, whereby the operator may see the desired color scheme with each color properly related to the others, so that the color scheme is exposed in such manner as to display a color combination in which the relative color values may be accurately observed and compared, and further to provide a color chart of this class in which the true relative values of the colors of the desired color scheme will not be impaired or distorted to the eye of the observer by the display of other colors at the same time.

My improvement comprises a disc-shaped color wheel. These color wheels are well known to those skilled in the art and the wheel based on the Newton-Brewster theory of a mixture of pigments is arranged with the three primary colors red, yellow and blue, at equally spaced apart positions, and between the red and yellow, and arranged in clockwise order, there are red-orange, orange and yellow-orange, and between the yellow and blue there are arranged in the same order, yellow-green, green and blue-green, and between the blue and the red there are arranged in the same order blue-violet, violet and red-violet.

Figures 3, 4, 5, 6:
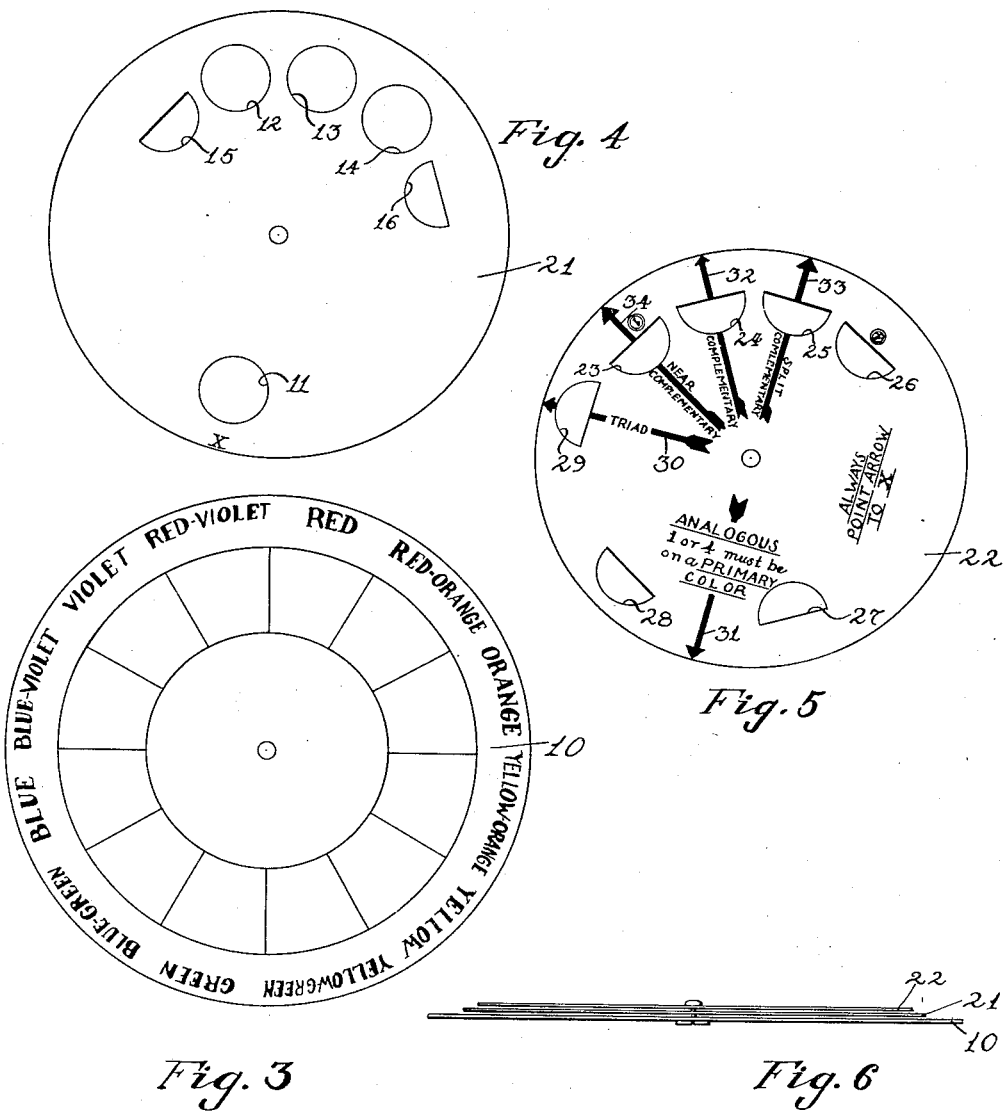
Figure 3 shows a plan view of the color wheel.
Figure 4 shows a plan view of the intermediate disc.
Figure 5 shows a plan view of the upper disc.
Figure 6 shows a central sectional view of the color chart.

Rotatably mounted at the central portion of the color wheel which is indicated generally by the reference numeral 10, is an intermediate disc 21, smaller than the disc 10. This disc is formed with a circular opening 11 at one side and three circular openings 12, 13 and 14 at the diametrically opposite side of the intermediate disc and spaced from the center of the disc equally. The centers of these openings 12, 13 and 14 are spaced apart the distance of the center of one color area on the color wheel to the center of an adjoining color area on the color wheel. Adjacent the circular opening 12 is a semi-circular opening 15, one color area to the left, and adjacent the opening 14 is another similar opening 16, one color area to the right. Adjacent the opening 11 there is an indicating mark, preferably the letter "X". The openings 15 and 16 are semi-circular in outline and arranged equi-distant from the center of the disc, and are arranged below the centers of the openings 12, 13 and 14, as shown in Fig. 4.

On top of the intermediate disc 21 there is rotatably mounted an outer disc 22 of smaller diameter than the disc 21. This outer disc is formed at one side with four semi-circular openings 23, 24, 25 and 26 positioned to register with the inner half respectively of the openings 11, 12, 13 and 14, of the disc 21, and register with one or the other of the openings 15 and 16, and when brought into such registration, to expose the inner halves of the openings 11, 12, 13 and 14. On the side of the disc 22 diametrically opposite the said opening 24 is a similar opening 27.

There is also formed in the disc 22 a semi-circular opening 28 arranged in a position diametrically opposite the opening 26, and so positioned that when brought into registration with one of the openings 11, 12, 13 and 14 it will display the color visible through the outer half of said opening. A similar opening 29 is formed adjacent the opening 23, as shown in Fig. 5.

Marked upon the disc 22 is an arrow 30 at the opening 29 pointing to the circumference of the disc, and adjacent this arrow is the legend "Triad." Midway between the openings 27 and 28 is an arrow 31, and adjacent this arrow is the legend "Analogous," followed by the instruction "1 or 4 must be on a primary color." Adjacent the opening 24 is an arrow 32, and the legend "Complementary," and adjacent the opening 25 is an arrow 33 and the legend "Split complementary," and adjacent the opening 23 is an arrow 34 and the legend "Near complementary".

Figure 2:
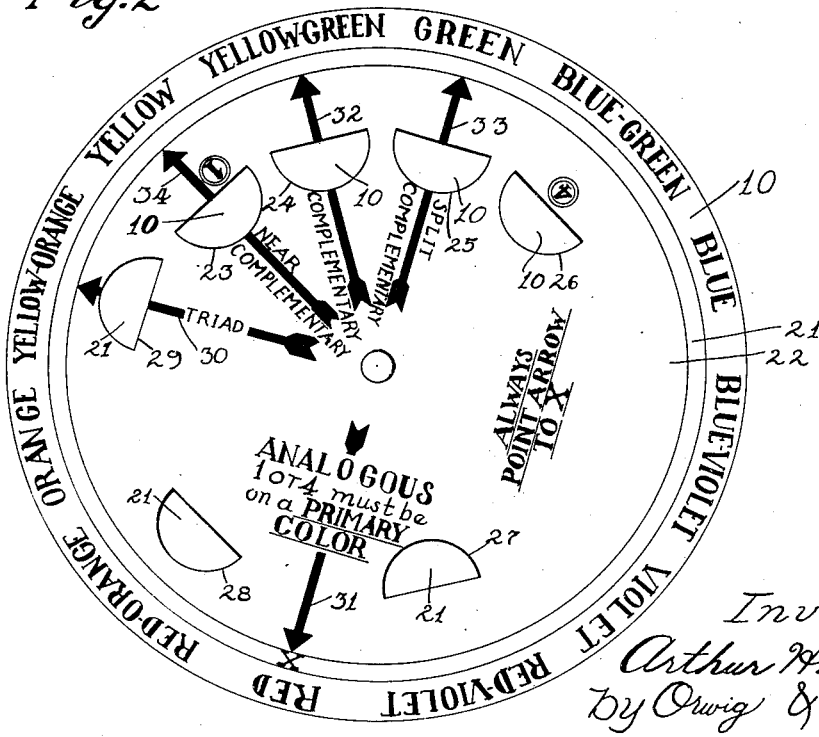
Figure 2 shows a similar view with the discs adjusted to position for displaying four colors analogous to yellow shading toward but not including the next primary color, blue, and concealing all other colors.

In practical use, and assuming that it is desired to display to the operator the colors analogous to yellow, shading toward but not including the next primary color, blue, the operator first moves the intermediate disc to the position where the indicating mark "X" is adjacent the red color on the color wheel, as shown in Figure 2. He then moves the outer disc to position with the arrow marked "analogous" pointing to the indicating mark "X", whereupon it will be seen that through the openings 15, 12, 13 and 14, respectively, in the intermediate disc, and through the openings 23, 24, 25 and 26 in the outer disc there will be displayed the colors yellow, yellow-green, green and blue-green equally spaced apart, all of the same size and shape, and all other colors are concealed. By this means the operator is enabled to view this color scheme with the colors equally balanced in size and arranged in such relative locations that the true color scheme may be observed without having the true relative values of the desired colors distorted by having other colors displayed at the same time.

Figure 1:
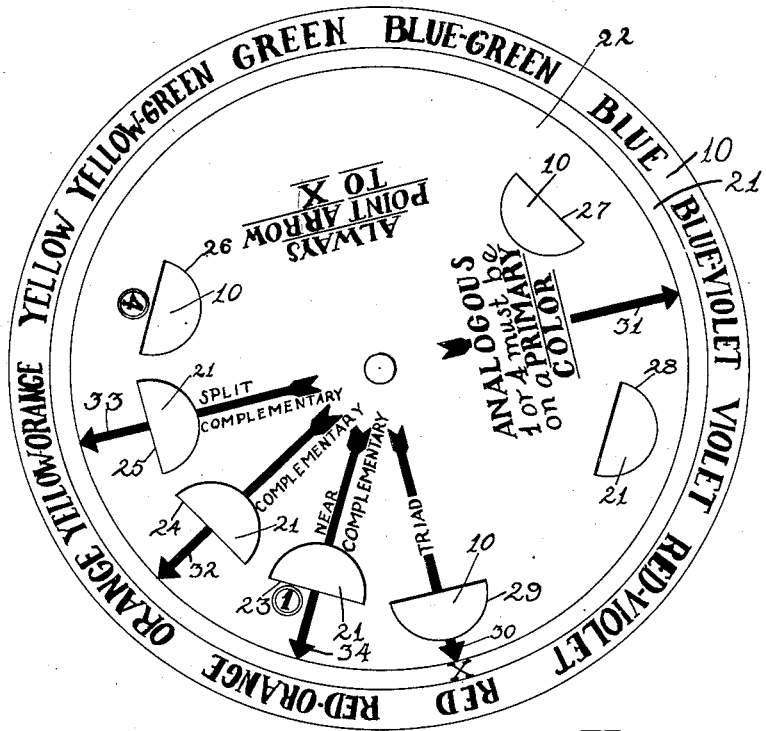
Figure 1 shows a plan view of a color chart embodying my invention, with the discs set to position for displaying a triad of the colors red, yellow and blue, equally spaced apart and of the same size and showing all of the other colors concealed.

In the event that the operator desires to display the "Triad," this may be done, as shown in Figure 1, by moving the intermediate disc to the position with its indicating mark "X" adjacent the red color on the color wheel, and moving the outer disc to position with the arrow of the "Triad" pointing to such indicating mark, and when this has been done, then the color "red" will be shown through the opening 29, yellow through the opening 26, and blue through the opening 27, and all other colors are covered so that the operator may again visualize only the desired colors of the "Triad" undistorted by the observation of other colors.

"Split complementary" colors may be observed in the same manner by adjusting the arrow adjacent to the legend "Split complementary" on the outer disc to position pointing to the indicating mark "X" on the intermediate disc and any desired colors will show through openings 25, 27, and 28 on the outer disc. These will show only the inner half of the colors on the color wheel through the large openings 11 and 12 on the intermediate disc, and the outer half of opening 14. Also, by adjusting the arrow adjacent to "Complementary" on the outer disc, to position pointing to "X" on the intermediate disc there will be shown complementary colors through openings 24 and 27 on the outer disc, the inner half of the colors on the color wheel appearing through the openings 11 and 13 on the intermediate disc. Also, by adjusting the arrow adjacent to "Near complementary" on the outer disc to position pointing to "X" on the intermediate disc, there will be shown near complementary colors through openings 23 and 27 on the outer disc, the inner half of the colors on the color wheel appearing through openings 11 and 14 in the intermediate disc.

The arrows on the outer disc are always moved to the indicating mark "X" on the intermediate disc to obtain the desired color plan and the two discs in this position are rotated together until the desired colors appear.

By means of my improvement an unskilled operator may readily, quickly and easily obtain true color combinations for instruction work, decorative work, flower arrangement, etc., with the desired color scheme always exposed in equal amounts and with all other colors concealed so that the operator may obtain a visual illustration of the desired color scheme, and whereby a selected one of the indicating marks on the outer disc is placed adjacent to the indicating mark "X" on the intermediate disc and the two discs rotated upon the color wheel to display the desired color scheme, with all other colors concealed.

I claim as my invention:

A color chart, comprising a color wheel on which the color areas are arranged in circular form equally spaced apart, an intermediate disc rotatably mounted on the color wheel and having at one side three relatively large openings equally spaced from the center of the disc, through which may be viewed at the same time three of the adjacent color areas of the color wheel and having another opening of the same size diametrically opposite from the central one of said three openings and spaced from the center of the disc the same distance as that of the said three openings, said intermediate disc also having two relatively small openings, one at each side of said relatively large openings and spaced apart from said relatively large openings such distance that there may be viewed through them, two color areas of the color wheel immediately adjacent the ones viewable through said three relatively large openings, the size and positions of said relatively small openings being such that the color area viewable through each is approximately half that which is viewable through the large openings at the side adjacent the center of the disc, an outer disc rotatably mounted on the intermediate disc and having at one side four relatively small openings equally spaced apart the distance of the color areas of the color wheel and so positioned that any one of them may be placed to coincide with any of the small openings of the intermediate disc, said outer disc also having a small opening adjacent said four openings on the counter-clockwise side thereof and positioned for disclosing the outer portion only of a color area viewable through a large opening in the intermediate disc, said outer disc also having two small openings, the first being spaced apart in a counter-clockwise direction from the last mentioned opening the distance of two color areas of the color wheel and shaped and positioned to disclose the outer half only of a color viewable through any of the large openings of the color wheel, and the second one of said two small openings being spaced apart in counter-clockwise position from the first the distance of two color areas of the color wheel and being shaped and positioned to disclose the inner half only of a color area viewable through any of the large openings of the color wheel.

ARTHUR H. KEYES.